United States Patent Office 3,291,618
Patented Dec. 13, 1966

3,291,618
DENTAL IMPRESSION MATERIALS
Jacque C. Morrell, 8 Oxford St., Chevy Chase, Md.
No Drawing. Filed Sept. 23, 1965, Ser. No. 489,759
12 Claims. (Cl. 106—38.35)

This invention relates to dental impression compositions particularly of the alginate type and is a continuation-in-part of my application, Serial No. 158,943, filed December 8, 1961, now abandoned and particularly Serial No. 375,957 filed June 17, 1964, which is a continuation-in-part of the former application.

A primary objective is to produce compositions which provide dental impressions possessing the qualities of elasticity and resilience as well as rigidity and toughness or strength so balanced that precision dental impressions may be made and removed from undercuts without rupture or permanent deformation. A specific requirement in dentistry is making dentures, both full and partial, as well as bridges, is accurate dental reproduction with maximum comfort to the patient, and this is also a general objective of my invention.

It is among the further objectives of this invention to produce models or casts from such impressions that possess hard smooth surfaces free from chalkiness and dusting in handling during use of the same or in storage.

Another important objective of my invention is the production of a dental impression composition which is readily wetted and mixed with water to a smooth consistency with controlled setting time.

A further objective of the invention is to produce dental impression compositions which have long storage and shelf life, that is they show minimum or no deterioration with age during use and normal exposure to atmospheric conditions including warm and humid conditions.

Moreover the impressions made from my compositions require no fixing or after treatment in special solutions or baths which involve additional time and material and increased cost generally. The fixing operation refers to treatment of the impression after it has been made. In the earlier developments and until comparatively recently, this operation was necessary before pouring or applying the dental "stone" (generally a composition containing some form of plaster of Paris) to the impression to make a satisfactory model or cast. The fixing baths consisted of aqueous solutions of various inorganic salts and these materials, as well as the time and cost, are eliminated by the use of my composition.

Among the essential ingredients or components of my invention in its major or primary aspect are (a) the alginates especially the water soluble types such as the alkali metal alginates, e.g., sodium or potassium or ammonium alginates (b) calcium sulphate preferably in the dihydrate form, although the anhydrous and hemi-hydrate types also give good results; and (c) I also as a principal feature of my invention make use of certain selected fluorides specifically zinc fluoride in combination with a metal oxide neutralizer, preferably e.g., one selected from the group consisting of magnesium oxide and calcium oxide and in general a relatively water insoluble substance of the types disclosed herein which reacts to neutralize acids.

These oxides generally have the property of neutralizing acids such as hydrofluoric acid which may be formed in the mixture under some conditions and in general the oxides stabilize the mixture containing zinc fluoride without the addition of other fluorides. These and other novel combinations hereinafter referred to are employed by me.

It is especially to be emphasized that I may use zinc fluoride as the sole fluoride in the impression mixture and obtain excellent results unlike the prior art which requires that zinc fluoride be combined with sodium or potassium fluoride in order to stabilize the same against deterioration and spoilage on standing or in storage. The manner in which I accomplish this is a principal feature and the basis of my invention as noted above and hereinafter set forth.

The amounts of zinc fluoride used in my impression mixtures may vary from about 1% to about 10% by weight, and preferably from about 3% to about 5%. The amount of the basic oxides may also be in these ranges although in neither case is this limiting.

The calcium sulphate in the mixture reacts with the water soluble alginates to form an elastic and resilient impression base on the one hand, and it also reacts with the fluorides to form the insoluble calcium fluoride. The specific reactions and interreactions of these essential materials and those disclosed herein generally appear to be a prime requirement to produce the superior results I obtain, and to meet the foregoing objectives. In addition to these essential ingredients, I also make use of retarders, generally salts of an alkaline character such as tetrasodium pyrophosphate to control the rate of the reactions and to prevent premature setting; and I also make use of fillers such as diatomaceous earth (and other generally inert and water insoluble materials), for bulk and as a diluent of the more active ingredients. All of the materials are thoroughly mixed and in a finely divided state of subdivision, and when it is desired to use the resulting composition, it is admixed with water in proper proportions to form the impression, the details of which are fully described hereinafter. These and other aspects of my invention will be discussed and set forth more fully below.

The soluble salts of alginic acid (which is the essential gel forming material in various marine algae or plants), especially the potassium, sodium and ammonium alginates or mixtures of the same are suitable for my invention. The commercial product known as "Improved Kelmar" has been found very satisfactory. Calcium sulphate in the form of the anhydrous salt ($CaSO_4$), or the hemihydrate ($CaSO_4 \cdot \tfrac{1}{2}H_2O$) and preferably the dihydrate ($CaSO_4 \cdot 2H_2O$) may be employed. The soft soluble alginate is converted into the resilient and elastic insoluble type in an aqueous medium by interaction with calcium sulphate. The retarder which controls the rate of setting of the impression mixture may comprise a salt having an alkaline reaction generally such as sodium carbonate or trisodium orthophosphate or meta phosphate but I prefer the tetrasodium pyrophosphate for this purpose. With regard to the fillers, I prefer diatomaceous earth (e.g., the commercial product referred to as Hyflo-Super-Cal). However (although less desirable), other substantially inert and water insoluble materials such as calcium fluoride, carbonate or triphosphate, as well as various finely divided earths or clays and minerals, e.g., bentonite, talc, kaolin, etc., and various silicates such as those of the alkaline earth metals and those of aluminum and the heavier metals, e.g., lead silicate, alone or in admixture with the diatomaceous earth, or with each other, could be employed with varying results; especially in addition to diatomaceous earth.

As a major feature of my novel impression mixtures, I make use of zinc fluoride in combination with the use of the aforementioned alginates and with calcium sulphate as essential ingredients of my composition. The principal reaction of calcium sulphate with the soluble alginate has already been referred to. The reactions which may occur between the calcium sulphate and the zinc fluoride may be explained as follows:

Calcium sulphate is soluble in water to the extent of 0.2%, and the fluoride of zinc, for example, is dissolved to the extent of 0.005%. However calcium fluoride is soluble in water only to the extent of 0.002%, and the free calcium and fluoride ions furnished by the calcium sulphate and the zinc fluoride respectively are considerably in excess of the concentration required to precipitate them as calcium fluoride. The reaction thus goes forward until one of the other of the reactants is exhausted. It is thus noted that even with such a small concentration of fluoride ions as those furnished by the relatively insoluble zinc fluoride will cause precipitation of the even less soluble calcium fluoride. The same principal applies to magnesium fluoride. The reactions may be illustrated as follows:

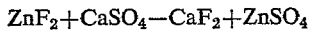
$$ZnF_2 + CaSO_4 \rightarrow CaF_2 + ZnSO_4$$

However, magnesium fluoride gives good results. In the absence of my improvement, however, zinc fluoride shows poor results due to instability of the mixture.

Whatever may be the explanation of the reaction in an aqueous medium or sequence of reactions in the mixture in relation to the physical properties of the impression and the "stone" model or cast made from the same, the result of my invention is an impression which is smooth and accurately defined and may be readily removed without breakage or distortion. Moreover, the model or cast made from these impressions are of a high degree of precision and part cleanly from the latter without adhesion and have glossy, flintlike non-dusting and non-chalking surfaces of a highly superior type. However as noted previously, the mixtures containing zinc fluoride while giving highly superior results when the mixture is fresh, deteriorate rapidly especially when stored in a humid atmosphere at high atmospheric or environmental temperatures and the product becomes useless for its intended purpose, in the absence of my improvement.

I believe in this connection that I am the first to use zinc fluoride in the particular combination mentioned herein, in impression mixtures containing the same and in addition containing the other essential ingredients namely the soluble alginates and calcium sulphate, and obtain superior results in all respects including storage stability and resistance to spoilage by the simple but effective step of adding a neutralizing oxide such as magnesium oxide and not at the same time adding or combining another fluoride with the zinc fluoride such as potassium or sodium fluoride. It is obvious that my mixture is much less expensive and less complicated than those disclosed in the prior art.

The amounts of the zinc fluoride which I may incorporate in my impression mixtures may vary from about 1% to about 10% by weight with a preferred range of from about 2% to about 5% more or less and the amount of magnesium oxide for example may also be in the same range and although preferred neither is limiting.

It is important to note in connection with my invention and the prior art that compositition containing zinc fluoride as the sole fluoride give very good results initially so far as control and quality of impression and the cast is concerned, but such compositions as stated have been found to be notoriously unstable or have short shelf life especially in a warm and humid environment rendering the product useless for casts and impressions. Moreover the prior art has shown the addition of potassium or sodium fluorides to the zinc fluoride which as has been stated forms addition compounds with the other fluorides and does give very good results as claimed. However, the use of the potassium or sodium fluoride alone in the same type of mixture has been found impractical and unsatisfactory from a commercial viewpoint. The advantages in both reduction in costs and simplification in eliminating the use of the other fluorides to stabilize the zinc fluoride compositions is obvious.

With regard to the special aspect of my invention, I may add calcium oxide and preferably magnesium oxide to the mixture containing the zinc fluoride since it is effective, low in cost and easily obtainable and with no undesirable effects otherwise. The amounts of the neutralizing oxide used for illustration may be from about 1% to about 10% by weight or preferably about 3% to about 5%, but as pointed out below none of these amounts are limiting, and therefore amounts in excess of 10% may be used. It is to be noted in the above connection and in general with this aspect of my invention that I refer to these oxides as metal oxide neutralizers because in general they (as well as the other compounds referred to below) show an alkaline reaction in neutralizing acids, e.g., hydrofluoric acid which may be the cause of deterioration on standing. These basic materials have low water solubility.

The neutralizing agents are insoluble in water or only slightly soluble and neutralize acids. Some further examples of these in addition to the oxides or carbonate are the hydrated oxides of magnesium, calcium, and barium.

Of these the basic group of oxides are preferred, especially magnesium oxide. Also in those cases where the addition of an oxide or similar acid neutralizing agent is indicated (such as with zinc fluoride) the flourides corresponding to the oxide added are very sparingly soluble in water. For example the solubility in water of the hydroxide of calcium and magnesium (which in effect represents the solubility of the oxides) are all less than about 0.2% (the solubility of calcium hydroxide). For example the solubility of magnesium hydroxide is 0.0001%. Barium hydroxide is more soluble being 4%. On the other hand sodium and potassium hydroxides are more than 100% soluble. The latter two substances are not satisfactory.

It is to be understood that none of these basic substances are equivalent; also that magnesium oxide is preferred.

In general I may add basic metal oxides to my improved dental impression mixtures on a non-equivalent basis.

In connection with this aspect of my invention and recapitulating: The prior art use of zinc fluoride in dental impression mixtures of the type noted and referred to above shows the latter when used in impression mixtures to produce good impressions and casts when fresh, but to be very unstable on exposure to warm and humid atmospheres and to deteriorate with age quite rapidly and in general to have poor shelf life. In this connection I have been able to overcome these defects, and to protect against deterioration by the addition of the oxides, hydroxides (or hydrated oxides) or certain basic metal compounds, e.g., those of magnesium, or calcium, particularly magnesium oxide, and in general those compounds which have basic properties and preferably are sparingly soluble.

Further in this connection while I do not intend to be bound by an explanation or theory of the mechanism of protection, I have observed that the presence of free hydrofluoric acid in the impression mixtures, e.g., the use of acid fluorides, is very deleterious and is clearly observable in "graining" during mixing and in the unsuccessful attempts in making impressions and casts. The presence of hydrofluoric acid in mixtures containing zinc fluoride might be accounted for by hydrolysis of the latter when exposed to a moist and warm atmosphere and the breakdown phenomenon are comparable. The reaction may be represented as follows:

$$ZnF_2 + H_2O \quad 2HF + ZnO$$

The addition of zinc oxide for example would repress the formation of hydrofluoric acid; and the addition of the other oxides, e.g., magnesium oxide or compounds mentioned would also repress or neutralize this reaction.

Having described the various materials which may be employed in connection with my invention and pointed out certain variations in the practice, I shall proceed to show more particularly the steps of the process of its application together with the preferred materials and their preparation to obtain best results.

Reverting to the manner in which my impression mixtures may be used and to the most suitable proportions for their use: The ingredients or components of the compositions of my impression mixtures which I have referred to above as preferred materials, i.e., the soluble alginate, e.g., potassium alginate (a suitable form is improved Kelmar), calcium sulphate dihydrate; the retarder, tetrasodium pyrophosphate; zinc fluoride; the basic or alkaline water insoluble neutralizer, e.g., magnesium oxide, and the filler, diatomaceous earth (e.g., Hyflo-Super Cal).

All of the materials should be in finely divided form, and thoroughly mixed. On a generalized basis, the proportions of materials may vary considerable. Satisfactory results may be obtained within the following illustration of range and intermediate compositions shown for convenience in parts per one hundred parts by weight or percent, although I am not limited thereto.

| Material | Parts by Weight or Percent | | |
|---|---|---|---|
| | Range | Intermediate Compositions | |
| | | (1) | (2) |
| Potassium Alginate | 12-15 | 13.5 | 13.0 |
| Calcium sulphate dihydrate | 12-16 | 12.5 | 15.0 |
| Retarder (Sodium Pyrophosphate) | 1-5 | 2.0 | 3.5 |
| Zinc fluoride | 2-5 | 4.2 | 2.9 |
| MgO Oxide (Metal Oxide Neutralizer) | 0-10 | 3.0 | 5.0 |
| Filler-Diatomaceous Earth | 75-49 | 64.8 | 60.6 |

Variations in the proportions of ingredients may be on an even wider basis than shown in the above illustration for example as already pointed out, zinc fluoride may vary from about 1% to 10% and the calcium sulphate, dependent on the type and the extent of hydration and other ingredients from about 10% to about 20%. The filler will vary in amount with the variation in the other ingredients; and where the diatomaceous earth is supplemented by some other filler, e.g., bentonite, kaolin, calcium or magnesium carbonate, etc. the proportions used of the former are less. All of these data are by way of examples and are not to be construed as limiting.

In the production of the dental impression material all components or ingredients are reduced to finely divided or powdered form and sieved to about 80 mesh in size or finer. After mixing in a suitable type of mechanical mixer (such as a rotary helicoid ribbon type or double cone or other efficient tumbling type) the lumps may be broken down by passing through a coarse mechanical sieve. At this stage, the material is ready for packaging and distribution for use. Flavoring or coloring material may be introduced after mixing with a small amount of diatomaceous earth, calcium or magnesium carbonate or magnesium oxide.

*Specific examples*

The table shows a number of specific examples in connection with various compositions and ingredients each in general being to some degree dependent on the results desired although they need not necessarily be widely different for best results and, on the other hand, may vary considerably, in accordance with the desired results.

| Ingredients, Percent by Weight | $ZnF_2$ Zinc Fluoride | $ZnF_2$ Zinc Fluoride | $ZnF_2$ Zinc Fluoride | $ZnF_2$ Zinc Fluoride |
|---|---|---|---|---|
| Potassium Alginate | 13.5 | 13.5 | 13.8 | 13.5 |
| Calcium Sulphate Dihydrate | 12.1 | 12.8 | 12.5 | 12.5 |
| Retarder Tetrasodium Pyrophosphate | 2.0 | 2.0 | 2.3 | 2.2 |
| Fluoride, etc. (See above) | 3.8 | 4.2 | 4.4 | 4.1 |
| Magnesium Oxide | 2.5 | 3.5 | 3.5 | 7.5 |
| Filler Diatomaceous Earth | 65.0 | 64.0 | 61.5 | 60.2 |
| Example No. | (1) | (2) | (3) | (4) |

REMARKS: Good but non-equivalent results may be obtained also with wider variations in components than those shown in accordance with preceding table, etc., and the use of the other basic oxides, or low solubility neutralizers named above.

When used by the dentist, the impression material prepared as described is mixed with water generally at room temperature to the consistency of a somewhat heavy, smooth, creamy paste-like material. Spatulation of the wet mixture may take place in about one half to one minute, and it is then transferred to the tray to be applied to the mouth. Generally, the latter operation takes place in about a minute or a minute and a half, and the material is allowed to set for about three and one-half to four minutes in the mouth; the whole operation consuming about six minutes. The proportion of water used is about 10 to 10.5 gms. of the powdered impression mixture to about 25 cc. of water, or generally a ratio of about 2.5 parts of water to 1 part of the material. All of these data are illustrations only.

All of the above data on use may vary somewhat, those shown being illustrative of satisfactory conditions for good results.

The temperature of the water, as well as the room temperature, though not critical, have a very appreciable effect on the setting time, decreasing with increase in temperature and vice versa. This is in accord with effect of temperature generally on reaction rates. Generally room temperatures, depending on individual taste, varies between about 68° F. and 74° F. and this is a satisfactory working range, although good results may be obtained in a somewhat wider range with minor adjustments.

Any suitable dental "stone" (generally a plaster of Paris composition) of which there are a number available, made up to proper consistency with water, may be employed in making the "stone" cast or model. Moreover, as previously stated, fixing is eliminated, that is the impressions made with my compositions do not have to be treated in a fixing bath or solution prior to making the cast or model, and the latter, with the use of my invention, are hard, smooth and durable.

There may be many modifications of my invention with-

I claim:

1. A dental impression composition consisting essentially of a mixture of an alkali metal alginate, calcium sulphate, a metal fluoride, a basic neutralizing substance of low water solubility in an amount of about 1% to about 10% of the said composition and selected from the group consisting of the oxides and hydrated oxides of magnesium, calcium, and barium, an inert filler and a retarder, the said fluoride consisting essentially of zinc fluoride as the sole added fluoride in said composition necessary to obtain the desired results and being present in an amount of from about 1% to about 10%, said composition being adapted to eliminate fixing while maintaining controlled setting time and minimizing deterioration with age and environmental exposure, and to provide smooth and accurate impression and casts.

2. A dental impression composition consisting essentially of a mixture of an alkali metal alginate, hydrated calcium sulphate, a metal fluoride, a basic neutralizing substance of low water solubility in an amount of about 1% to about 10% of the said composition selected from the group consisting of the oxides of magnesium, calcium, and barium, an inert filler and a retarder consisting of sodium pyrophosphate, the said fluoride consisting essentially of zinc fluoride as the sole added fluoride in said composition necessary to obtain the desired results, and being present in an amount of from about 1% to about 10%, said composition being adapted to eliminate fixing while maintaining controlled setting time and minimizing deterioration with age and environmental exposure, and to provide smooth and accurate impression and casts.

3. A dental impression composition consisting essentially of a mixture of an alkali metal alginate, hydrated calcium sulphate, a metal fluoride, a basic oxide selected from the group consisting of the oxides of magnesium, calcium, and barium, in an amount from about 1% to about 10%, a retarder and an inert filler comprising diatomaceous earth, the said fluoride consisting essentially of zinc fluoride as the sole added fluoride in said composition necessary to obtain the desired results and being present in an amount from about 1% to about 10%, said composition being adapted to eliminate fixing while maintaining controlled setting time and minimizing deterioration with age and environmental exposure and to provide smooth and accurate impressions and casts.

4. A dental impression composition consisting essentially of an aqueous solution of an alkali metal alginate, hydrated calcium sulphate, a metal fluoride, a basic oxide, a basic metal oxide consisting of magnesium oxide in an amount from about 1% to about 10%, a retarder, and an inert filler, the said fluoride consisting essentially of zinc fluoride as the sole added fluoride in said composition necessary to obtain the desired results, and being present in an amount from about 1% to about 10%, said composition being adapted to eliminate fixing while maintaining controlled setting time and minimizing deterioration with age and environmental exposure, and to provide smooth and accurate impression and casts.

5. A dental impression composition consisting essentially of a mixture of an alkali metal alginate, calcium sulphate hydrated, a metal fluoride, a basic metal oxide consisting of barium oxide in an amount of from about 1% to about 10%, an inert filler comprising diatamaceous earth and a retarder consisting of sodium pyrophosphate, the said fluoride consisting essentially of zinc fluoride as the sole added fluoride in said composition necessary to obtain the desired results and being present in an amount of from about 1% to about 10%, said composition being adapted to eliminate fixing while maintaining controlled setting time and minimizing deterioration with age and environmental exposure, and to provide smooth and accurate impression and casts.

6. A dental impression composition consisting essentially of a mixture of an alkali metal alginate, hydrated calcium sulphate, a metal fluoride, a basic metal oxide selected from the group consisting of magnesium and calcium oxides in an amount from about 1% to about 10%, a retarder, and an inert filler, the said fluoride consisting essentially of zinc fluoride as the sole added fluoride in said composition necessary to obtain the desired results and being present in an amount of from about 2% to about 5%, said composition being adapted to eliminate fixing while maintaining controlled setting time and minimizing deterioration with age and environmental exposure, and to provide smooth and accurate impression and casts.

7. A dental impression composition consisting essentially of a mixture of an alkali metal alginate, hydrated calcium sulphate, a metal fluoride, a basic metal oxide neutralizer consisting of magnesium oxide, an inert filler and a retarder, the said fluoride consisting essentially of zinc fluoride as the sole added fluoride in said composition necessary to obtain the desired results and being present in an amount of from about 1% to about 10%, the said magnesium oxide being added as an essential part of said composition and being adapted to neutralize acidic products and to stabilize the said composition and minimize deterioration of the same with age and environmental exposure and to provide smooth impressions and casts.

8. A dental impression composition consisting essentially of a mixture of an alkali metal alginate, calcium sulphate dihydrate, a metal fluoride, a basic metal oxide and neutralizer consisting of magnesium oxide in an amount from about 1% to about 10% and an inert filler comprising diatomaceous earth, a retarder consisting of sodium pyrophosphate, the said fluoride consisting essentially of zinc fluoride as the sole added fluoride in said composition necessary to obtain the desired results and being present in an amount of from about 2% to about 5%, said composition being adapted to eliminate fixing while maintaining controlled setting time and minimizing deterioration with age and environmental exposure, and to provide smooth and accurate impression and casts.

9. A dental impression composition consisting essentially of a mixture of an alkali metal alginate, calcium sulphate, a metal fluoride, a basic metal oxide neutralizer consisting of magnesium oxide and in an amount of from about 1% to about 10%, a retarder, and an inert filler, the said fluoride consisting essentially of zinc fluoride as the sole added fluoride in said composition necessary to obtain the desired results and being present in an amount of from about 1% to about 10%, said composition being adapted to eliminate fixing while maintaining controlled setting time and minimizing deterioration with age and environmental exposure, and to provide smooth and accurate impression and casts.

10. A dental impression composition consisting essentially of a mixture of an alkali metal alginate, hydrated calcium sulphate, a metal fluoride, a metal oxide neutralizer selected from the group consisting of the oxide and hydrated oxide of calcium and in an amount of from about 1% to about 10%, an inert filler and a retarder, the said fluoride consisting essentially of zinc fluoride as the sole added fluoride in said composition necessary to obtain the desired results and being present in an amount of from about 1% to about 10%, said composition being adapted to eliminate fixing while maintaining controlled setting time and minimizing deterioration with age and environmental exposure, and to provide smooth and accurate impression and casts.

11. A composition for taking dental impressions of the type described in claim 3 wherein the said composition is dispersed in an aqueous medium.

12. In a dental impression composition consisting essentially of an alkaline metal alginate, calcium sulphate and a metal fluoride the said fluoride consisting essentially of zinc fluoride as the sole reactive fluoride added to said composition, the said zinc fluoride being present in an amount of from about 1% to about 10%, the improvement which consists of an additional essential component of the said composition selected from the group of basic metal oxides consisting of the oxides of magnesium, calcium and barium, said basic metal oxides being adapted to neutralize acidic products and to stabilize the said composition and minimize deterioration with age and environmental exposure and to provide smooth and accurate impressions and casts.

References Cited by the Examiner

UNITED STATES PATENTS 2,652,312  9/1953  Fink _____ 106—38.5
2,769,717  11/1956  Cresson _____ 106—38.35

FOREIGN PATENTS 754,375  8/1956  Great Britain.

MORRIS LIEBMAN, *Primary Examiner.*

ALEXANDER H. BRODMERKEL, *Examiner.*

L. B. HAYES, *Assistant Examiner.*